(12) United States Patent
Jancic (10) Patent No.: US 10,186,240 B2
(45) Date of Patent: Jan. 22, 2019

(54) SOUND DEFLECTOR FOR WIND INSTRUMENTS

(71) Applicant: Silvin Jancic, Villmergen (CH)

(72) Inventor: Silvin Jancic, Villmergen (CH)

( * ) Notice: Subject to any disclaimer, the term of this patent is extended or adjusted under 35 U.S.C. 154(b) by 0 days.

(21) Appl. No.: 15/559,166

(22) PCT Filed: Apr. 6, 2016

(86) PCT No.: PCT/IB2016/051935
§ 371 (c)(1),
(2) Date: Sep. 18, 2017

(87) PCT Pub. No.: WO2016/166637
PCT Pub. Date: Oct. 20, 2016

(65) Prior Publication Data
US 2018/0075827 A1 Mar. 15, 2018

(30) Foreign Application Priority Data
Apr. 13, 2015 (CH) .................................... 00509/15

(51) Int. Cl.
*G10D 9/00* (2006.01)
*G10D 9/06* (2006.01)
(Continued)

(52) U.S. Cl.
CPC ............... *G10D 9/06* (2013.01); *F16C 11/04* (2013.01); *G10D 9/00* (2013.01); *F16B 2/10* (2013.01)

(58) Field of Classification Search
CPC .................................. G10D 9/06; F16C 11/04
See application file for complete search history.

(56) References Cited

U.S. PATENT DOCUMENTS

| 3,099,183 | A |  | 7/1963 | Alles |
| 4,012,983 | A | * | 3/1977 | Ploeger .................... G10D 9/00 181/155 |

(Continued)

FOREIGN PATENT DOCUMENTS

| DE | 20 2004 012 767 U1 | 10/2004 |
| EP | 1 113 699 A2 | 7/2001 |

(Continued)

OTHER PUBLICATIONS

International Search Report for PCT Serial No. PCT/IB2016/051935 dated Oct. 6, 2016.

*Primary Examiner* — Kimberly Lockett
(74) *Attorney, Agent, or Firm* — McCormick, Paulding & Huber LLP (57) ABSTRACT

A sound deflector for a wind instrument has a sound deflector plate and a device for the mounting thereof on the edge of a bell of the wind instrument. The device for mounting the deflector plate has an upper part and a lower part, which are respectively fastenable on the outer surface or the inner side of the bell edge. The upper and lower parts are connected to one another by means of a hinge. According to the invention, the lower part and upper part each have at least two nubs having rounded edges. When the upper and lower parts are brought together, the nubs of the upper part and lower parts are each arranged offset in relation to one another. The sound deflector enables fastening on instruments having bell edges of different shapes and curvatures or on music stands. The offset arrangement of the nubs on the mounting device enables a clamping fastening on a bell edge. The sound deflector according to the invention is therefore universally usable.

16 Claims, 8 Drawing Sheets

(51) Int. Cl.
*F16C 11/04* (2006.01)
*F16B 2/10* (2006.01)

(56) References Cited

U.S. PATENT DOCUMENTS

RE30,300 E 6/1980 Ploeger
2010/0001154 A1 1/2010 Chang

FOREIGN PATENT DOCUMENTS

EP 2 842 807 A1 3/2015
JP 2005-284035 A 10/2005

\* cited by examiner

SOUND DEFLECTOR FOR WIND INSTRUMENTS

CROSS-REFERENCE TO RELATED APPLICATIONS

This application is a National Stage application of International Patent Application No. PCT/IB2016/051935, filed on Apr. 6, 2016, which claims priority to Swiss Patent Application No. CH00509/15, filed on Apr. 13, 2015, each of which is hereby incorporated by reference in its entirety.

TECHNICAL AREA

The invention relates to a sound deflector for wind instruments, for example, a saxophone, and in particular a device for mounting such a sound deflector.

BACKGROUND

Figure 6:
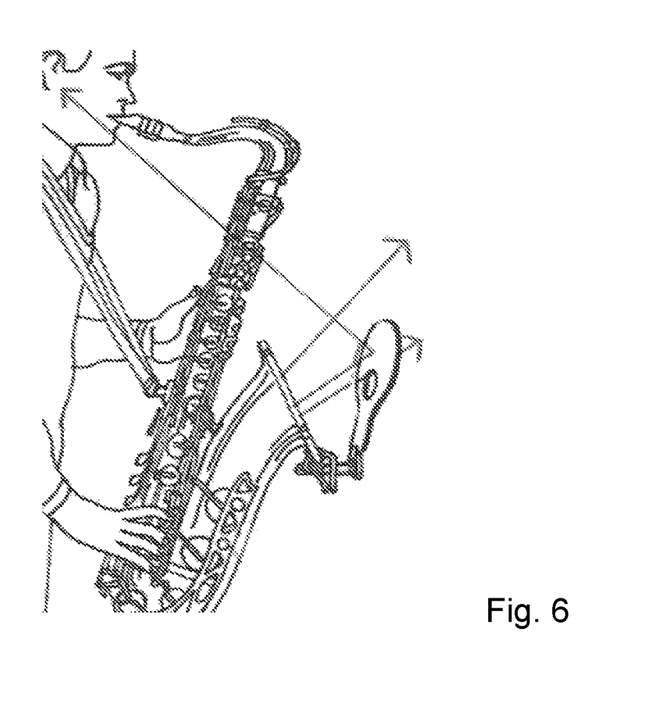
FIG. 6 shows a sound reflector according to the prior art.

Sound deflectors are used when playing instruments, in particular brass instruments, for example, saxophones or trumpets, to deflect the sound back to the player, so that he can hear himself better while playing in an orchestra or a band. Sound deflectors are commercially available, for example, the so-called "Ploeger sound mirror" for saxophones as shown in FIG. 6. It comprises a clamp made of plastic, which is fastened on the lower edge of the instrument bell by means of a spring clamp, wherein the fastening is to be placed as close as possible to the edge of the bell. A linear rod is fastened to the clamp, at the end of which the sound reflector is arranged. The linear rod can be adjusted in its position on the clamp, so that the distance between clamp and sound reflector is variable.

A further sound reflector may be fastened by means of an oblong plate on the bell, which extends over the entire diameter of the bell opening. Further known sound reflectors are intended for fastening on a music stand or another object independent of the instrument.

SUMMARY OF THE INVENTION

The object of the present invention is to provide a sound deflector for wind instruments which enables improved mounting on an instrument.

This object is achieved by a sound deflector.

A sound deflector is disclosed having a sound deflector surface and a device for the mounting thereof on the edge of the bell of a wind instrument.

According to the invention, the device for mounting the deflector surface has a lower part and an upper part, which are fastenable and fixable on the inner base or the outer side, respectively, of the bell. The upper and lower parts are connected to one another by means of a hinge. According to the invention, the lower part and upper part each have at least two nubs or protruding elements. When the upper and lower parts are brought together, the nubs of the upper part and lower part are each arranged offset in relation to one another. The sound deflector surface is connected to the upper and/or lower part.

A sound deflector according to the invention enables in particular fastening on instruments having bell edges of different shapes. The offset arrangement of the nubs on the mounting device enables a clamping fastening of the sound deflector on an instrument bell having different curvatures and different thicknesses of the bell and different shapes of the bell edge. The sound deflector according to the invention is thus employable on a saxophone, a trumpet, tuba, or other wind instrument or also, for example, on a music stand and is therefore universally usable. Due to the arrangement of the nubs on the clamping device, an optimized adaptation of the clamping device to the bell is achieved, so that only a small force has to be applied for fixing the upper and lower parts on the bell. Therefore, damage to the bell by pressure points as a result of excessive tightening of the fixing is avoided.

In one embodiment of the invention, the at least two nubs have rounded edges. This additionally contributes to avoiding pressure points on the bell of the instrument.

In one embodiment, the nubs comprise rubber. This enables an optimized adaptation of the nubs to the profile of the instrument bell and further protects the bell from damage due to the clamping pressure.

In one special embodiment, the upper part and the lower part each have three nubs, which are uniformly distributed on the upper part or lower part, respectively, and press against one another when the upper and lower parts are brought together and rest on a bell edge, wherein the bell edge is located in between. This embodiment causes increased stability of the fastening.

In a further embodiment, the upper part and lower part each have a rounded, flat shape, on which the nubs are distributed. In this embodiment, the enclosure of the bell edge by the nubs is similar to that of teeth of a set of teeth, the upper and lower teeth of which are arranged offset in relation to one another.

In one embodiment, the upper part and the lower part of the mounting device are formed with unequal lengths, so that the one part protrudes beyond the other. The lower part and upper part each have two nubs, which are each arranged on the outer end of each part facing away from the hinge.

In one embodiment, the deflector surface is fastened pivotably on the same hinge of the upper and lower parts. This enables easy and rapid alignment of the deflection surface using only one hand.

The deflector surface is therefore directly connected to the upper and lower parts by means of the hinge which is used for fastening by clamp mounting. The mounting is thus embodied as small and light and also compact having a small number of elements and small leverages. Overall, this enables simple handling of the device even during playing.

In one embodiment, the hinge is fixable by means of a screw. The strength of the connection of the deflector surface to the upper and lower parts can thus be adapted.

In one embodiment, there is a clearance between the hinge of the mounting device and the nubs which are closest to the hinge. If the wind instrument has a bead at its edge, the bead can thus be placed in this clearance.

In one variant, the mounting of the sound deflector has a detachable screw fastening for the fixing thereof.

In an alternative embodiment, the mounting of the sound deflector has a spring for the fixing thereof.

According to the invention, the sound deflector can have one of the above-described embodiments and also a plurality of the features in combination.

Further advantages of the invention follow from the following description, in which the invention is explained in greater detail on the basis of an exemplary embodiment illustrated in the schematic drawings.

BRIEF DESCRIPTION OF THE DRAWINGS

FIGS. 3a-d show the device for mounting the sound deflector on the bell edge of a wind instrument, of which

FIGS. 7a-c show a further embodiment of the mounting device of the sound deflector according to the invention, of which

The same reference signs have been used for the same elements in the figures and initial explanations relate to all figures, if not otherwise expressly mentioned.

DETAILED DESCRIPTION

Figure 1:
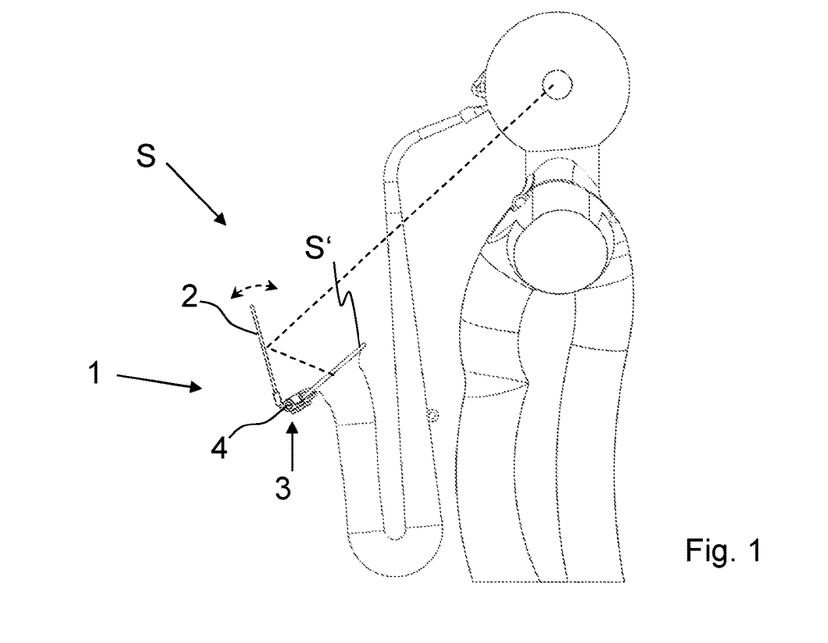
FIG. 1 shows the sound deflector according to the invention in the use by a saxophone player.

FIG. 1 shows a sound deflector 1 according to the invention fastened on a wind instrument, for example, a saxophone S. The deflector 1 has a deflector surface or plate 2 manufactured from plastic, for example, which is fastenable and fixable by clamping by means of a device 3 for mounting the deflector surface 2 on the bell edge S' of the instrument. The device has two parts 5 and 6 for this purpose, which are connected to one another by means of a hinge 4. The deflector surface 2 is settable in its angle alignment in relation to the bell edge S' by pivoting movement of the surface 2 about the hinge axis 4 using a hand. The musician can thus also adjust the angle alignment of the sound deflector using one hand during playing. The sound deflector 1 is distinguished by its compact embodiment, in particular of the holding device 3. Both the hinge function of the clamping device and also the hinge function for changing the angle alignment of the deflector surface 2 are integrated in the same element 3.

Figure 2A:
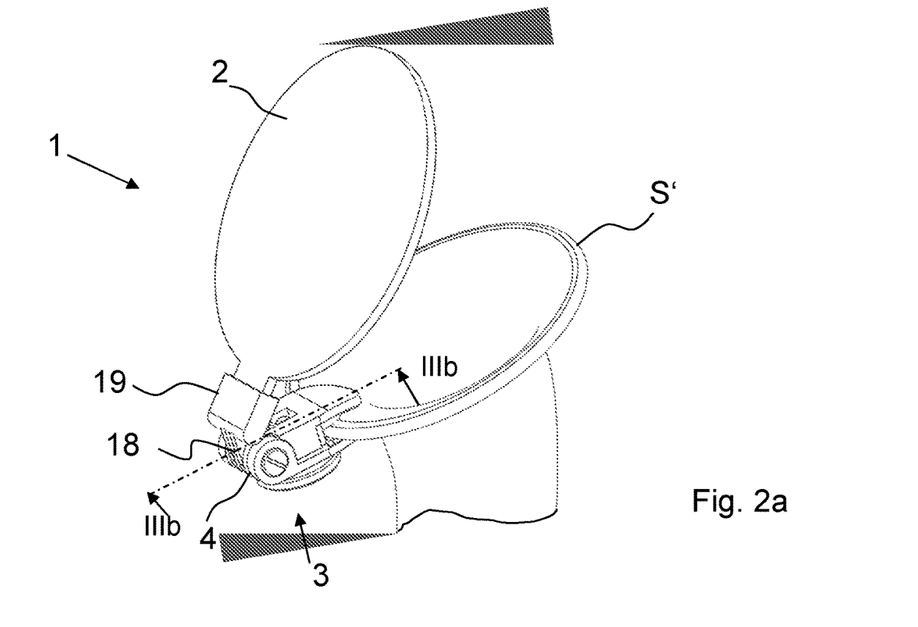
FIG. 2a shows the sound deflector as a whole in perspective.
Figure 2B:
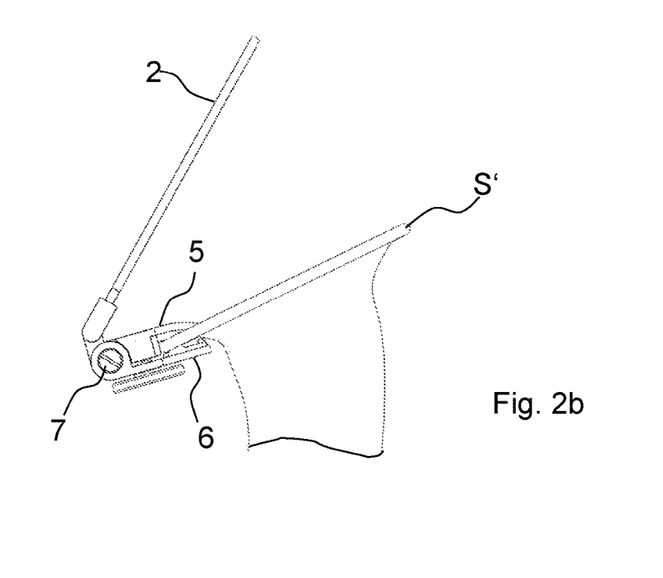
FIG. 2b shows the sound deflector from FIG. 2a in a side view.

FIGS. 2a and b show the sound deflector 1 and in particular the mounting 3 in greater detail. The device 3 has an upper part 5 and lower part 6, or jaws 5, 6, which are connected to one another by means of the hinge 4. The two parts 5 and 6 of the hinge 4 and a connecting element 18 for the deflector plate 2 (shown in greater detail in FIG. 5 and explained in the description thereof) are held together by means of a screw 7 or another suitable hinge pin. The upper and lower parts 5, 6 can be folded apart by means of this hinge 4 and applied around the edge of the bell S' of a wind instrument. In this case, the upper part 5 is applied to the inner side and the lower part 6 is applied to the outer side of the bell S'. The two parts 5, 6 are fastenable and fixable on the bell, by bringing them together by means of the hinge 4 and fastening them by clamping, for example, by means of a fixing screw 8 and screw nut 8'. In this case, the two parts 5, 6 can also be fixed in another manner, for example, by a compression spring, a torsion spring, or a traction spring.

FIGS. 3a-d show the embodiment of the fastening device 3 in greater detail. Protruding elements or nubs 9a and 10a are arranged on the upper part 5, which extend toward the lower part 6, while the lower part 6 has protruding elements 9b and 10b, which extend toward the upper part. In particular, the protruding elements 9a, 9b of the upper and lower parts and the protruding elements 10a, 10b are each arranged opposite to one another but offset. A set of teeth results by way of this arrangement when the upper and lower parts 5, 6 are brought together. This means that the elements 9a and 9b do not strike one another centrally but rather laterally displaced. This applies similarly to the elements 10a and 10b. The relative lateral displacement enables a bell to be held stably, and this is independent of its curvature. The elements 9a, b, 10a, b are additionally distinguished in particular by the rounded edges 9', 10' thereof, as identified in FIG. 3c. These rounded edges increase the adaptation accuracy of the fastening device 3 to a curved shape of the bell.

A clearance F, which is used for the placement of a thickened bell edge S' of an instrument, is implemented between the hinge 4 of the clamping device 3 and the innermost protruding elements 9a, 9b, which are located closest to the hinge 4. In the example shown, the clearance F is implemented in the region between the fixing screw 8 and the innermost protruding elements 9a and 9b. The clearance F is embodied, for example, by recesses on element 9b and 9a or corresponding flanks on the elements.

Figure 3A:
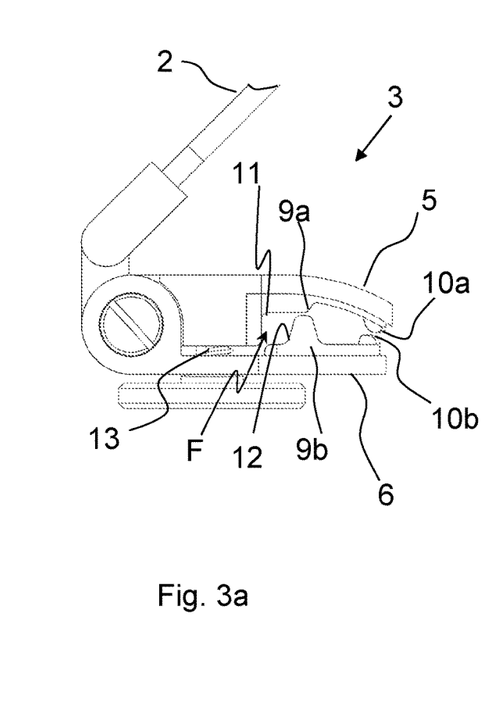
FIG. 3a shows the closed device for mounting the sound deflector in a side view.
Figure 3B:
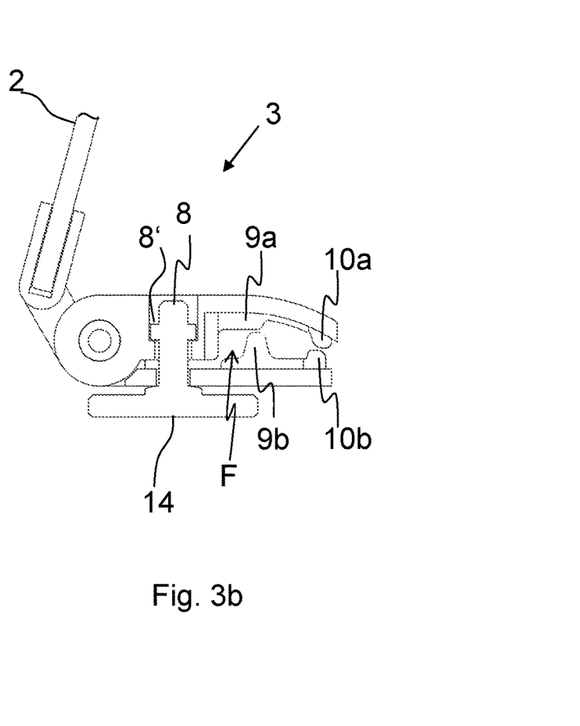
FIG. 3b shows the closed device in a cross-sectional view along IIIb-IIIb in FIG. 2a, FIG. 3c shows the open device in a cross-sectional view.
Figure 3C:
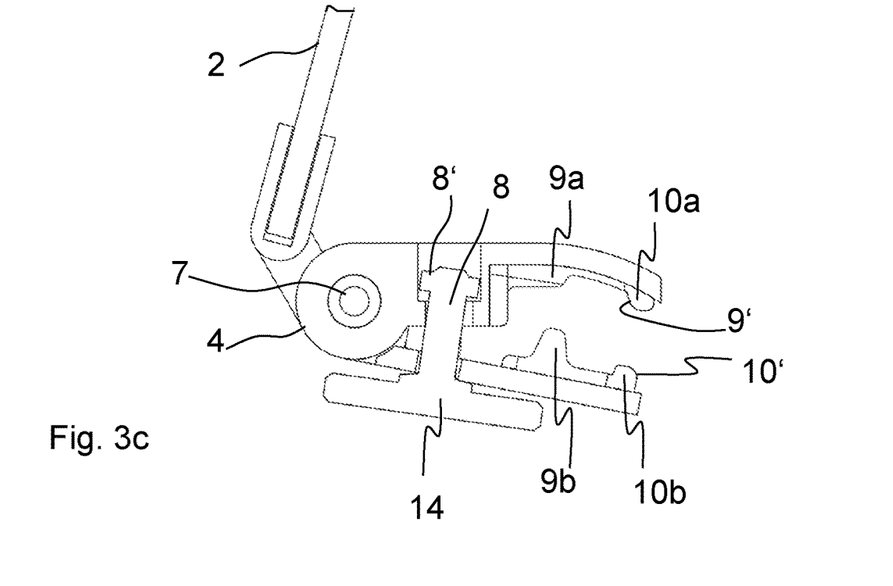
Figure 3D:
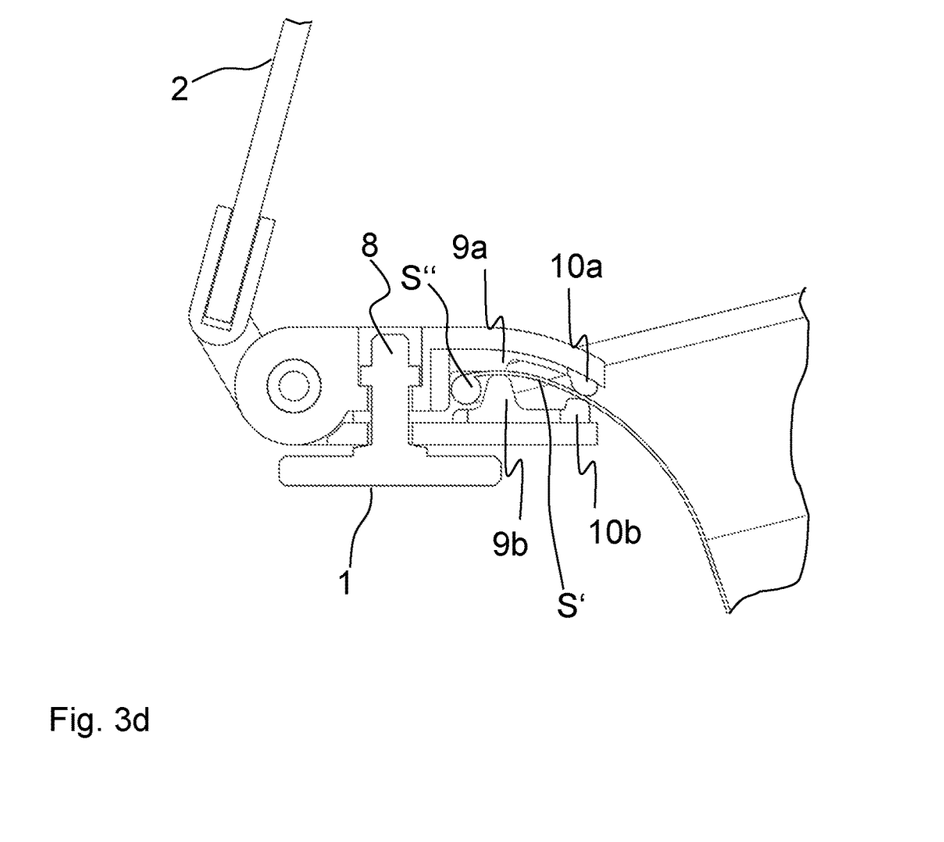
FIG. 3d shows the closed device in a cross-sectional view arranged on a bell edge.

If the device is fastened on the bell edge S', the bead S" of the bell edge S' comes to rest in the clearance F, as shown in FIG. 3d, without being damaged.

The outer elements 10a and 10b, which are remote from the hinge, are, similar to the incisors of a set of teeth, arranged offset, by arranging the element 10a of the upper part 5 further outward in comparison to the element 10b of the lower part 6. When the upper and lower parts 5, 6 are brought together, the protruding elements touch in the region of the rounded edges thereof. This offset arrangement together with the rounding of the edges 9', 10' enables a placement of a curved bell S' as shown in FIG. 3d. In particular, the offset arrangement enables universal use in differently shaped bells, as is the case, for example, with trumpets, saxophones, tubas, etc.

FIG. 3a additionally shows a coiled spring 13. This spring 13 additionally facilitates the mounting of the fastening device in that the upper and lower parts 5, 6 open by themselves due to the spring tension and only the fixing screw 8 has to be actuated by means of the rotating knob 14.

FIGS. 4a-d show an embodiment of the mounting device of the sound deflector having semicircular upper and lower parts 5, 6, wherein the inner protruding elements 9a and 9b are each embodied twice and the protruding elements 10a and 10b are each embodied once at the outer end of the parts 5, 6. The embodiment of the clamping device according to FIGS. 4a-d has a total of three pressure points and thus causes a balanced positioning, which is optimized with respect to stability, of the device.

Only the hinge parts 4*a* and 4*b* of the upper part 5 or lower part 6, respectively, are shown of the hinge 4 here. Moreover, an opening 15 for the fixing screw 8 is shown.

Figure 4A:
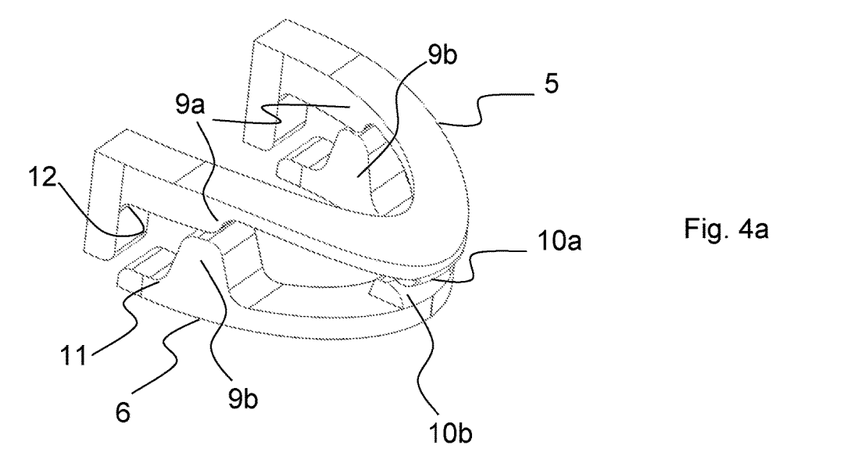
FIG. 4a shows the upper and lower parts of the device from FIG. 2b as individual parts in perspective.
Figure 4B:
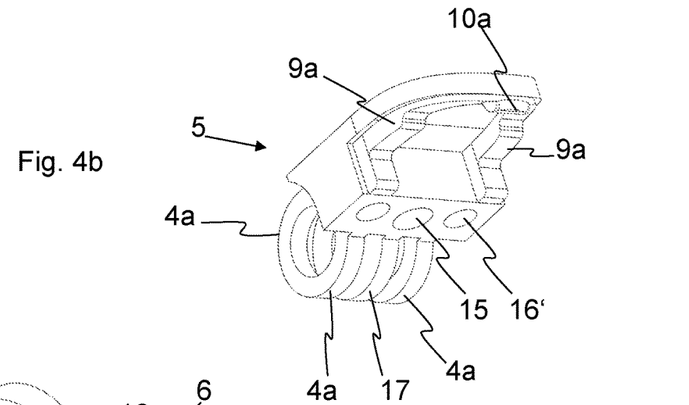
FIG. 4b shows the upper part from FIG. 2b having hinge part in a perspective view from below.
Figure 4C:
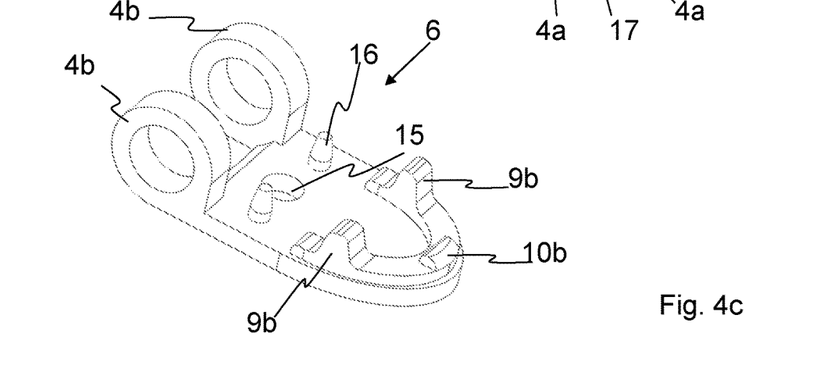
FIG. 4c shows the lower part from FIG. 2b having hinge part in a perspective view from above.
Figure 4D:
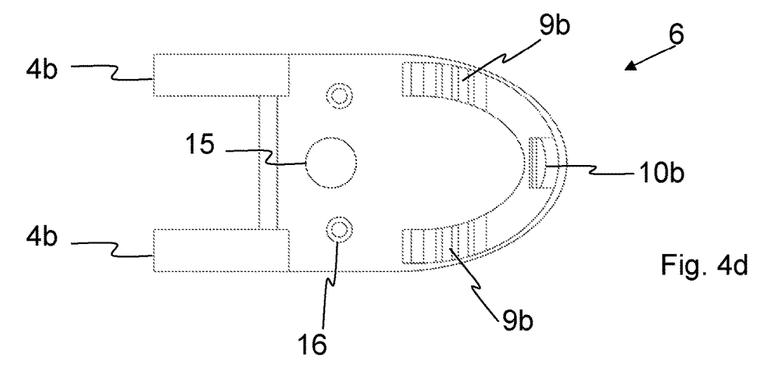
FIG. 4d shows the lower part from FIG. 2b in a top view.

The lower part 6 additionally has, according to FIG. 4*c*, for example, two pins 16, which are guided in corresponding recesses 16' in the upper part 5 according to FIG. 4*b*. The pins 16 and recesses 16' are used for guiding two springs 13, which are shown in FIG. 3*a*.

The fastening device 3 can also be implemented having only two nubs in the upper part and two nubs in the lower part. This also enables the desired function of the fastening.

Figure 5:
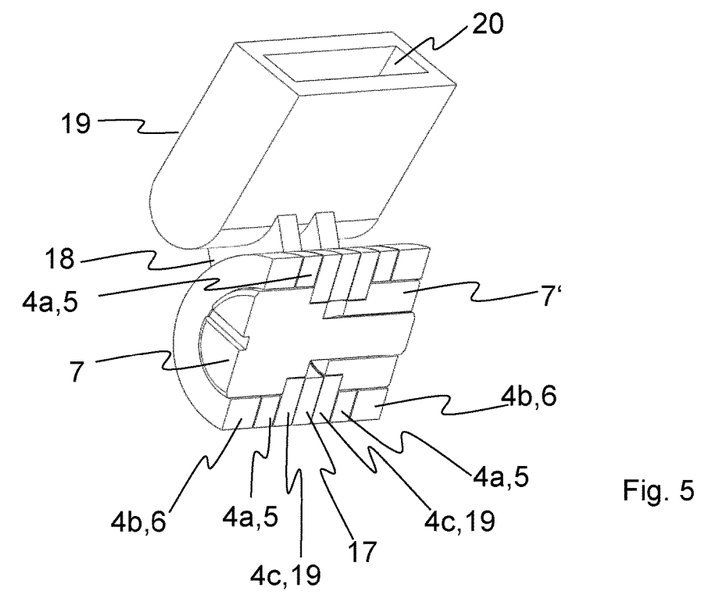
FIG. 5 shows a perspective view of the hinge of the device from FIG. 2b in a cross section.

FIG. 5 shows the hinge 4 having hinge parts 4*a* and 4*b* of the upper part 5 or lower part 6, respectively, and hinge parts 4*c* of the mounting 19, which are held together using a screw 7 and a bolt T in the function of a hinge pin. A further hinge having a hinge eye 17 is movably positioned between the hinge parts 4*c*, wherein the hinge eye 17 is part of the upper part 5, as shown in FIG. 4*b*. A connecting element 18 for the deflector surface or plate 2 is connected to the hinge parts 4*c*. The connecting element 18 has for this purpose, for example, a mounting 19 having an opening 20, into which the deflector surface 2 can be inserted. The mobility of the connecting part 18 in the hinge 4 and therefore also the strength of the mounting for the deflector plate 2 can be changed by tightening or loosening the screw connection 7, T, which is also used as a hinge pin.

Figure 7A:
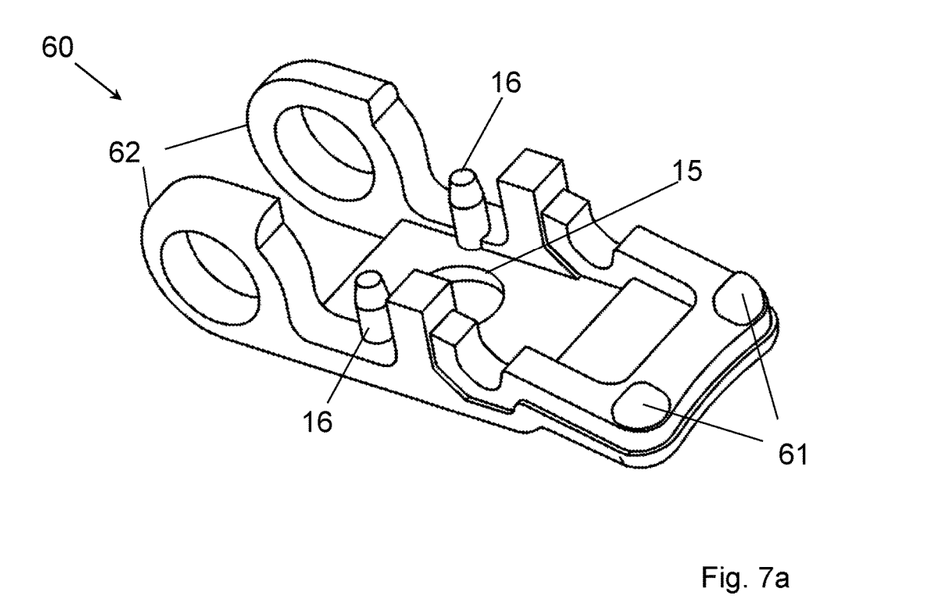
FIG. 7a shows a perspective view of the lower part.

FIGS. 7*a-c* and 8*a-b* show a further embodiment of the sound deflector according to the invention, which, instead of a mounting device 3 as shown in the preceding figures, has a device 30 for mounting the deflector surface on a wind instrument or music stand. The basic principle of this further embodiment is the same as in FIGS. 1-5, namely a clamping fastening by means of the upper part 50 and lower part 60 using nubs 51 or 61, respectively, which are applied to the edge of the wind instrument (or music stand), and a hinge 40. The sound deflector is again connected by means of a mounting 19 and a connecting part 180 to this hinge 40. FIG. 7*a* shows the lower part 60 having two nubs 61, which are arranged at one end of the lower part 60, preferably symmetrically with respect to its longitudinal axis. During fastening of the clamping device 30 on a wind instrument, these nubs 61 come to rest on the outer side of a bell S', see FIG. 7*c*. Two hinge parts 62 are arranged at the other end of the lower part 60, opposite to the nubs 61. The lower part 60 additionally has two pins 16 and an opening 15, which assume the same function as the pins 16 and a centrally arranged opening 15 in the device from FIGS. 2-5.

Figure 7B:
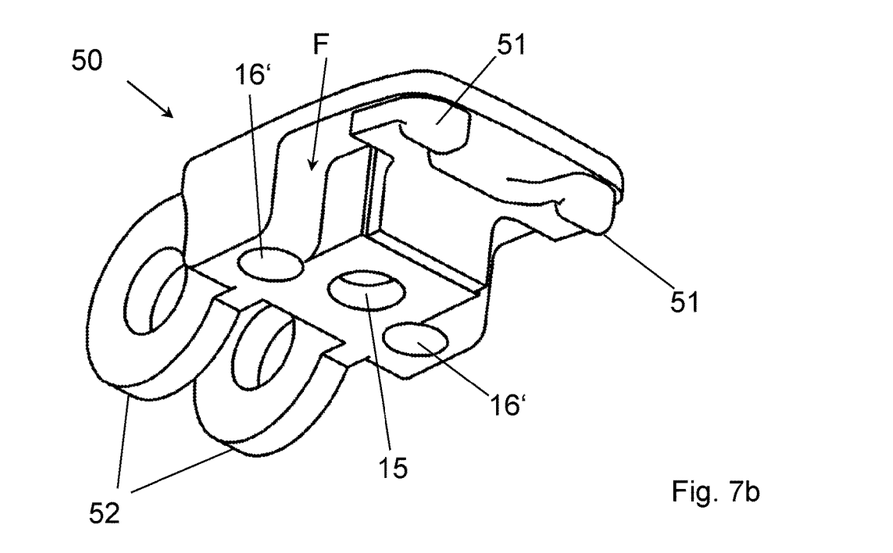
FIG. 7b shows a perspective view of the upper part.

FIG. 7*b* shows the upper part 50 having two nubs 51, which are arranged at one end of the upper part 50, again preferably symmetrically with respect to its longitudinal axis. These nubs 51 come to rest on the inner surface of the bell S' during the fastening on the wind instrument. Two hinge parts 52 are arranged at the end of the upper part 50 opposite to the nubs 51. The upper part 50 additionally has a centrally arranged opening 15 and two openings 16', which accommodate the pins 16 of the lower part in FIG. 7*a* when upper and lower parts are brought together. The opening 15 in lower part 60 and upper part 50 is used for accommodating a fixing screw 8 as also disclosed in FIGS. 3*a-d*.

Figure 7C:
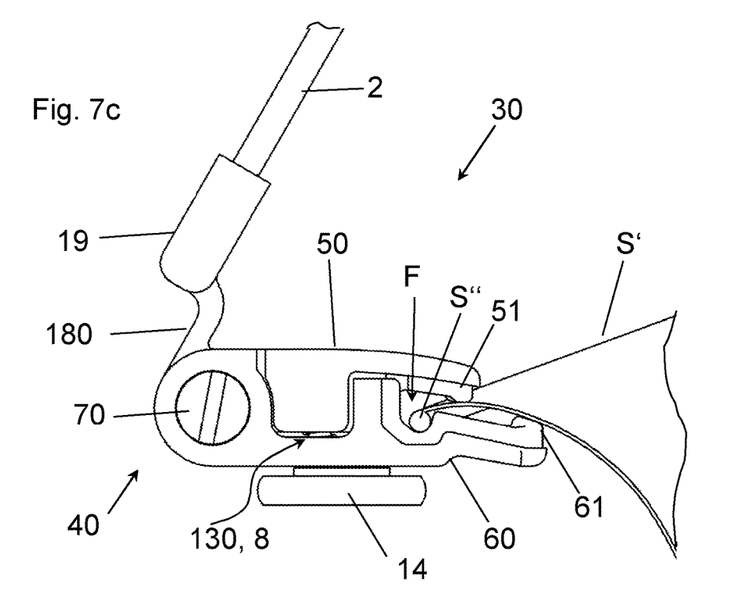
FIG. 7c shows a side view of the mounting device having connecting part and part of the deflector surface.

The upper part 50 and lower part 60 are of unequal lengths in one embodiment of the invention, and in the exemplary embodiment shown, the lower part 60 is longer than the upper part 50, as shown in the side view of FIG. 7*c*. If upper and lower parts 50 and 60 are brought together and fastened by clamping at the bell edge S' of a wind instrument, the lower part 60 thus rests with the two nubs 61 on the outer side of the bell S, while the upper part 50 rests with nubs 51 on the inner side of the bell S', wherein the nubs 51 are located closer to the edge of the bell having bead S" than the nubs 61. A clearance F is implemented large enough to be able to accommodate the bead S" between the hinge 40 and the nubs 51 of the upper part 50, in particular between the fixing screw 80 and the nubs 51. Because both the upper part 50 and also the lower part 60 each have two nubs on the outer ends thereof, four pressure points result on the bell surface, whereby the sound deflector is mounted stably on the bell of the wind instrument. A screw 70 having bolt 70' is again used for fixing the hinge 40 of the holding device 30. The hinge 40 is connected to a connecting part 180, which is in turn connected to the mounting 19 for the sound deflector surface 2.

Figure 8A:
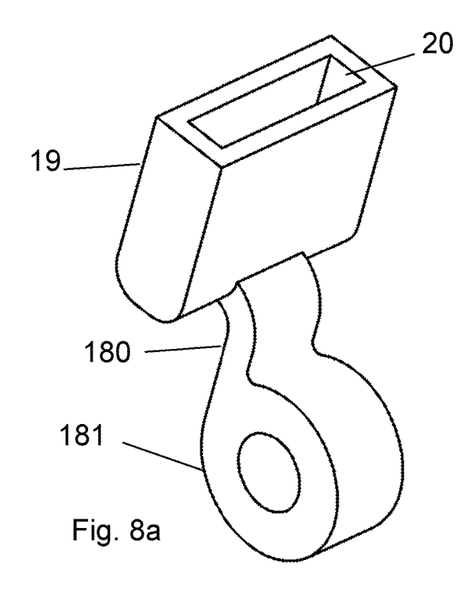
FIG. 8a shows a perspective view of a further embodiment of the connecting part between the hinge and the sound deflector surface.
Figure 8B:
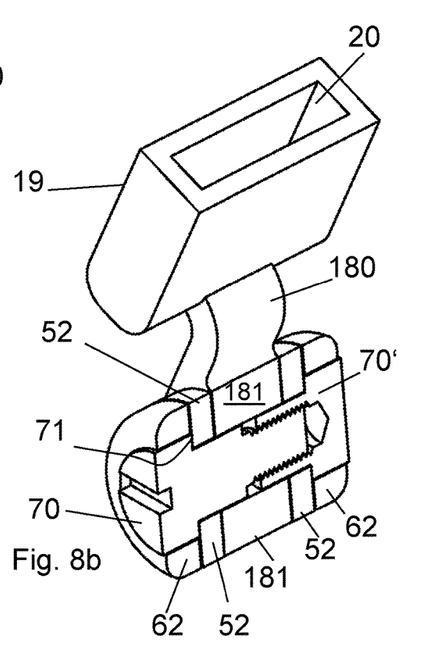
FIG. 8b shows the holding device from FIGS. 7a-c and in particular a perspective view of a further embodiment of the hinge having fixing screw in cross section.

FIGS. 8*a* and 8*b* show a further embodiment of the connecting part 180 between the hinge of the holding device 30 and the mounting 19 for the sound deflector surface 2. In this embodiment, the connecting part 180 only has one hinge eye 181, while in comparison the embodiment in FIG. 5 has two such hinge parts 4*c*. The hinge eye 181 is arranged between the two hinge parts 52 in cooperation with the upper part 50. In this case, the hinge parts 52 of the upper part 50 press against the lower side 71 of the head of the screw 70, while the one hinge part 62 of the lower part 60 presses against the side 72 of the head of the screw 70. The hinge eye 181 thus does not press against the head of the screw 70, but rather is spaced apart by the hinge part 52 from the head of the screw 70. If the connecting part 180 for the deflector surface 2 is pivoted to adjust the angle alignment of the deflector surface 2, the screw 70 is thus not moved, since the hinge eye 181 does not press against the head of the screw 70. The screw connection 70, 70' thus remains fixed even in the event of a movement of the deflector surface and undesired loosening of the clamping device 30 is prevented.

Alternatively, the hinge parts of the lower part can also be arranged between the hinge parts of the upper part, wherein the hinge eye 181 of the connecting part 180 would press against the hinge parts of the lower part. Undesired loosening of the screw connection 70, 70' would similarly be prevented.

The device 30 for mounting a deflector surface on a wind instrument additionally has a spring 130, which is arranged over one of the pins 16. Alternatively, such a spring can also be placed on the fixing screw 80. The spring 13 can also be arranged on the fixing screw 8 in the device from FIGS. 2-6.

The embodiment of the hinge 40 and embodiment of the connecting part 180 having screw 70 as shown in FIGS. 7 and 8 can also be applied to the upper part and lower part from FIGS. 2-5.

While the present disclosure has been illustrated and described with respect to particular embodiments thereof, it should be appreciated by those of ordinary skill in the art that various modifications to this disclosure may be made without departing from the spirit and scope of the present disclosure.

What is claimed is:

1. A sound deflector for a wind instrument, wherein the sound deflector has a sound deflector surface and a device for its mounting on the edge of a bell of the wind instrument, wherein the device for mounting the deflector surface has an upper part, which is fastenable on an inner surface of the bell, and a lower part, which is fastenable on an outer side of the bell, wherein the upper part and the lower part are connected to one another by means of a hinge, and the lower part and the upper part each have at least two nubs, which, when the upper part and the lower part are brought together, have the nubs of the upper part arranged offset in relation to the nubs of the lower part, and the sound deflector surface is fastened on the upper part and/or the lower part.

2. The sound deflector according to claim 1, wherein the nubs on the upper part and the lower part have rounded edges.

3. The sound deflector according to claim 1, wherein the nubs on the upper part and the lower part comprise rubber.

4. The sound deflector according to claim 1, wherein the upper part and the lower part each have three nubs.

5. The sound deflector according to claim 4, wherein the upper part and the lower part each have a flat, rounded shape, on which the nubs are uniformly distributed.

6. The sound deflector according to claim 1, wherein the upper part and the lower part each have two nubs.

7. The sound deflector according to claim 6, wherein two nubs are each arranged on one end of the upper part and on one end of the lower part.

8. The sound deflector according to claim 6, wherein the lower part and the upper part are of unequal lengths.

9. The sound deflector according to claim 1, wherein the deflector surface is fastened by means of a connecting element on the hinge.

10. The sound deflector according to claim 1, wherein the upper part and the lower part each have two hinge parts and the connecting element to the deflector surface has a hinge eye, which is arranged between the hinge parts of the upper part and the lower part.

11. The sound deflector according to claim 1, wherein the hinge is fixable by means of a screw connection having a screw and a bolt.

12. The sound deflector according to claim 11, wherein one of the hinge parts of the upper part and one of the hinge parts of the lower part press against a head of the screw and the hinge eye is arranged spaced apart from the head of the screw.

13. The sound deflector according to claim 1, wherein the device for mounting the sound deflector has a detachable screw fastening for the fixing thereof on the bell.

14. The sound deflector according to claim 1, wherein a clearance exists between the hinge of the device for mounting the deflector surface and its nubs, which are located closest to the hinge.

15. The sound deflector according to claim 13, wherein a clearance exists between the detachable screw fastening and the innermost nubs.

16. The sound deflector according to claim 1, wherein the device for mounting the sound deflector has a spring arranged between the upper part and the lower part for its fixing on the bell.

* * * * *